United States Patent [19]
van der Griendt

[11] Patent Number: 6,036,430
[45] Date of Patent: Mar. 14, 2000

[54] LID INFEED SYSTEM USING A VACUUM AND ROTATING FINGER

[75] Inventor: Pieter S. van der Griendt, Far Hills, N.J.

[73] Assignee: Polytype America Corporation, Mahwah, N.J.

[21] Appl. No.: 09/240,428

[22] Filed: Jan. 29, 1999

[51] Int. Cl.[7] .................................. B65G 59/00
[52] U.S. Cl. ........................ 414/798.9; 414/797
[58] Field of Search ................... 414/798.9, 797, 414/907; 221/211, 268, 278, 271, 236, 238; 198/608, 663, 438; 271/3.11

[56] References Cited

U.S. PATENT DOCUMENTS

| | | | |
|---|---|---|---|
| 1,154,237 | 9/1915 | Dixon ................................ | 414/798.9 |
| 2,776,037 | 1/1957 | Baigent . | |
| 3,051,355 | 8/1962 | Honor . | |
| 3,101,866 | 8/1963 | Anderson . | |
| 3,439,793 | 4/1969 | Rakestraw . | |
| 3,497,086 | 2/1970 | Adams et al. ...................... | 414/798.9 |
| 3,760,453 | 9/1973 | Neumann . | |
| 4,005,668 | 2/1977 | Washington et al. . | |
| 4,054,212 | 10/1977 | Mueller ............................. | 414/798.9 |
| 4,323,168 | 4/1982 | Callahan . | |
| 4,364,466 | 12/1982 | Mojden ............................ | 414/798.9 |
| 4,435,114 | 3/1984 | Fardin . | |
| 4,462,745 | 7/1984 | Johnson et al. . | |
| 4,674,935 | 6/1987 | Feliks et al. . | |
| 4,697,973 | 10/1987 | Hahn et al. . | |
| 4,740,129 | 4/1988 | Sponseller . | |
| 4,758,126 | 7/1988 | Johnson et al. . | |
| 4,760,638 | 8/1988 | Ott et al. ............................ | 414/798.9 |
| 4,822,234 | 4/1989 | Johnson et al. . | |
| 4,927,319 | 5/1990 | Montali . | |
| 5,441,382 | 8/1995 | Mojden et al. ..................... | 198/419.1 |
| 5,470,195 | 11/1995 | Blank et al. . | |
| 5,547,336 | 8/1996 | Whiteman ......................... | 271/3.11 |
| 5,564,894 | 10/1996 | Moncrief . | |
| 5,653,576 | 8/1997 | Pearce . | |
| 5,957,655 | 9/1999 | Gomez ................................ | 198/438 |

*Primary Examiner*—Douglas Hess
*Attorney, Agent, or Firm*—Richard M. Goldberg

[57] ABSTRACT

A lid infeed system includes a pair of parallel and adjacent spinning rods for holding a stack of lids thereon; a feed plate assembly including a back plate at a forward end of the spinning rods against which the lids are moved against by the spinning rods, a front plate in front of the back plate, an inlet opening defined by the front plate and the back plate, an outlet opening defined by the front plate and the back plate, a vertically elongated vacuum opening arranged at a position offset to one side of a center plane between the spinning rods so as to pull only one side of the forwardmost one of the lids against the back plate and away from a next one of the lids of the stack, a finger rotatably mounted adjacent the vacuum opening, a drive for rotating the finger to force the forwardmost one of the lids toward the inlet opening after the forwardmost one of the lids has been pulled against the back plate and away from the next one of the lids of the stack at the vacuum opening, and a vacuum release opening in the back plate between the vacuum opening and the inlet opening for releasing any vacuum trapped between the forwardmost one of the lids and the back plate.

12 Claims, 5 Drawing Sheets

LID INFEED SYSTEM USING A VACUUM AND ROTATING FINGER

BACKGROUND OF THE INVENTION

The present invention relates generally to the feeding of lids of containers, and more particularly, is directed to a lid infeed system using a vacuum.

Conventionally, in order to transport container lids, a plurality of lids in stacked relation to each other, ride on two spinning rods which are adjacent and parallel or closely parallel to each other. As the rods spin, the lids are caused to move forwardly thereon.

A feed plate assembly is provided adjacent and above the spinning rods and has an opening at an inlet end with a width slightly greater than the width of a lid so that one lid can fit therein. In order to separate the lids from each other and push the forwardmost lid into the feed plate assembly, a spring is provided immediately adjacent the opening of the feed plate assembly and a timed eccentric cam arrangement pushes the spring down into engagement with the top of the forwardmost lid, serving to bias the forwardmost lid into good friction engagement with the spinning rods. As a result, the forwardmost lid is moved into the opening of the feed plate assembly by the friction engagement with one of the spinning rods.

The lids travel through the feed plate assembly and exit an outlet opening thereof, where they are adhered to a vacuum wheel having openings through which a vacuum is applied.

In many cases, the lids have lips which nest within each other in the stack. As a result of this nesting arrangement, it is sometimes difficult to disengage the forwardmost lid from the remainder of the stack, which may result in the machine being shut down.

Still further, due to the purely mechanical arrangement of the spring and spinning rods, it is possible that the spring may not engage the forwardmost lid with the correct force, so that there may be too much force, causing problems with bending or transporting of the lid, or too little force, which may result in too little friction with the spinning rods.

An arrangement is also known using similar apparatus, but with a rotatable finger that serves to push the forwardmost lid into the inlet opening of the feed plate assembly. Such apparatus is sold by F & L Machinery Design, Inc. of Edison, N.J. However, there is still a problem of disengaging the forwardmost lid from the remainder of the stack due to the lips of the lids and the nesting arrangement thereof, which may result in the machine being shut down.

OBJECTS AND SUMMARY OF THE INVENTION

Accordingly, it is an object of the present invention to provide a lid infeed system using a vacuum that overcomes the aforementioned problems.

It is another object of the present invention to provide a lid infeed system using a vacuum and rotating finger that transports the forwardmost lid from the stack to the vacuum wheel.

It is still another object of the present invention to provide a lid infeed system using a vacuum that separates the forwardmost lid from the nesting arrangement with the stack.

It is yet another object of the present invention to provide a lid infeed system having a rotatable finger that forces the forwardmost lid into the feed plate assembly after the vacuum separates the forwardmost lid from the nesting arrangement with the stack.

In accordance with an aspect of the present invention, a lid infeed system includes a pair of spinning rods for holding a stack of lids thereon; and a feed plate assembly including a back plate at a forward end of the spinning rods against which the lids are moved by the spinning rods, a front plate in front of the back plate, an inlet opening defined by the front plate and the back plate, an outlet opening defined by the front plate and the back plate, a vacuum opening arranged at a position in the back plate for pulling a forwardmost one of the lids against the back plate and away from a next one of the lids of the stack, a finger mounted adjacent the vacuum opening, and a drive for moving the finger to force the forwardmost one of the lids into the inlet opening after the forwardmost one of the lids has been pulled against the back plate and away from the next one of the lids of the stack at said vacuum opening.

The spinning rods are substantially parallel and adjacent to each other.

The vacuum opening is arranged at a position offset to one side of a center plane between the spinning rods so as to pull only one side of the forwardmost one of the lids against the back plate and away from a next one of the lids of the stack. Specifically, the vacuum opening is arranged at a position immediately adjacent the finger. Preferably, the vacuum opening has a vertically elongated configuration.

A vacuum chamber at a rear side of the back plate and in fluid communication with the vacuum opening supplies a vacuum to the vacuum opening.

Further, the finger is preferably rotatably mounted to the back plate adjacent the vacuum opening, and the drive rotatably moves the finger.

In accordance with another aspect of the present invention, a lid infeed system includes a pair of spinning rods for holding a stack of lids thereon; and a feed plate assembly including a back plate at a forward end of the spinning rods against which the lids are moved by the spinning rods, a front plate in front of the back plate, an inlet opening defined by the front plate and the back plate, an outlet opening defined by the front plate and the back plate, a vacuum opening arranged at a position in the back plate for pulling a forwardmost one of the lids against the back plate and away from a next one of the lids of the stack, a finger mounted adjacent the vacuum opening, a drive for moving the finger to force the forwardmost one of the lids into the inlet opening after the forwardmost one of the lids has been pulled against the back plate and away from the next one of the lids of the stack at said vacuum opening, and a vacuum release opening in the back plate between the vacuum opening and the inlet opening for releasing any vacuum trapped between the forwardmost one of the lids and the back plate.

The above and other objects, features and advantages of the invention will become readily apparent from the following detailed description thereof which is to be read in connection with the accompanying drawing.

DETAILED DESCRIPTION

Figure 1:
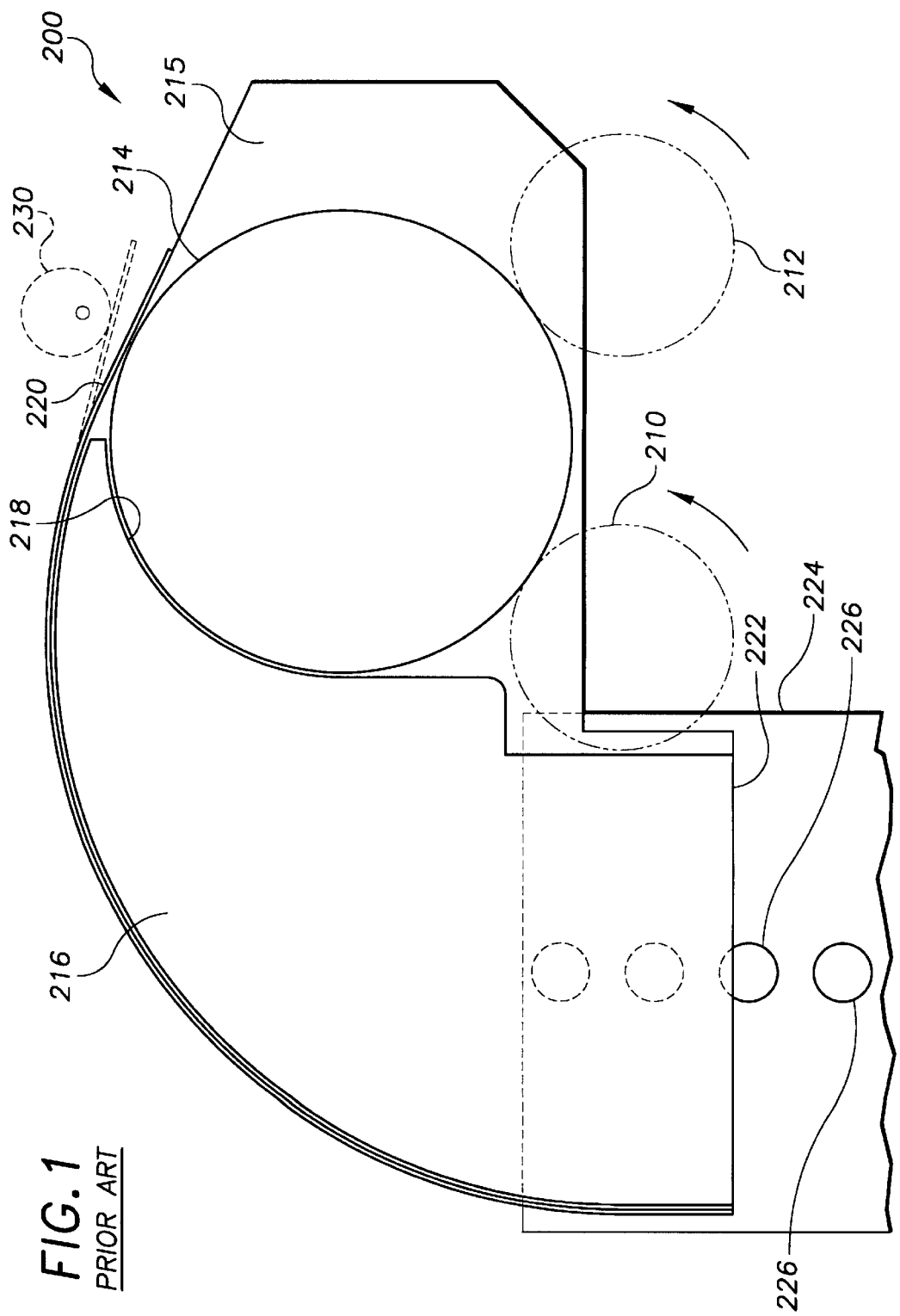
FIG. 1 is a front elevational view of a lid infeed system according to the prior art.

Referring initially to FIG. 1, a lid infeed arrangement according to the prior art includes two adjacent and parallel or close to parallel spinning rods 210 and 212. A plurality of lids 214 are in stacked relation to each other and ride on rods 210 and 212. As rods 210 and 212 spin, lids 214 are caused to move forwardly thereon, against a back plate 215 of a feed plate assembly 200.

A front plate 216 of feed plate assembly 200 is provided in spaced relation parallel to and in front of back plate 215 and is positioned adjacent to and above spinning rods 210 and 212. Feed plate assembly 200 includes an inlet opening 218 between front plate 216 and back plate 215, and has a width slightly greater than the width of a lid 214 so that one lid 214 can fit therein. A spring 220 is provided immediately adjacent and above opening 218 and serves to push or bias the forwardmost lid 214 into good friction engagement with spinning rods 210 and 212. A timed eccentric cam arrangement 230 is provided above spring 220 to push spring 220 into this engagement with forwardmost lid 214. As a result, the forwardmost lid 214 is moved into inlet opening 218 by friction engagement with spinning rod 210.

Lids 214 travel through feed plate assembly 200 and exit an outlet opening 222 thereof, where lids 214 are adhered to a vacuum wheel 224 having openings 226 through which a vacuum is applied and to which lids 214 adhere through the vacuum.

A problem with this arrangement is that in many cases, lids 214 have lips which nest within each other in the stack. As a result of this nesting arrangement, it is sometimes difficult to disengage the forwardmost lid 214 from the remainder of the stack, which may result in the machine being shut down.

Still further, due to the purely mechanical arrangement of spring 220 and spinning rods 210 and 212, it is possible that spring 220 may not engage the forwardmost lid 214 with the correct force, so that there may be too much force, causing problems with bending or transporting of the lid 214, or too little force, which may result in too little friction with spinning rods 210 and 212.

An arrangement is also known using similar apparatus to FIG. 1, but with a rotatable finger that serves to push the forwardmost lid 214 into opening 218. Such apparatus is sold by F & L Machinery Design, Inc. of Edison, N.J. However, there is still a problem of disengaging the forwardmost lid 214 from the remainder of the stack due to the lips of the lids 214 and the nesting arrangement thereof, which may result in the machine being shut down.

Referring now to FIGS. 2–6, there is shown a lid infeed system 8 according to the present invention. Lid infeed system 8 includes two adjacent and parallel spinning rods 10 and 12 for moving a stack of lids 14 forwardly thereon. Spinning rods 10 and 12 are rotated by a drive motor 11.

Figure 3:
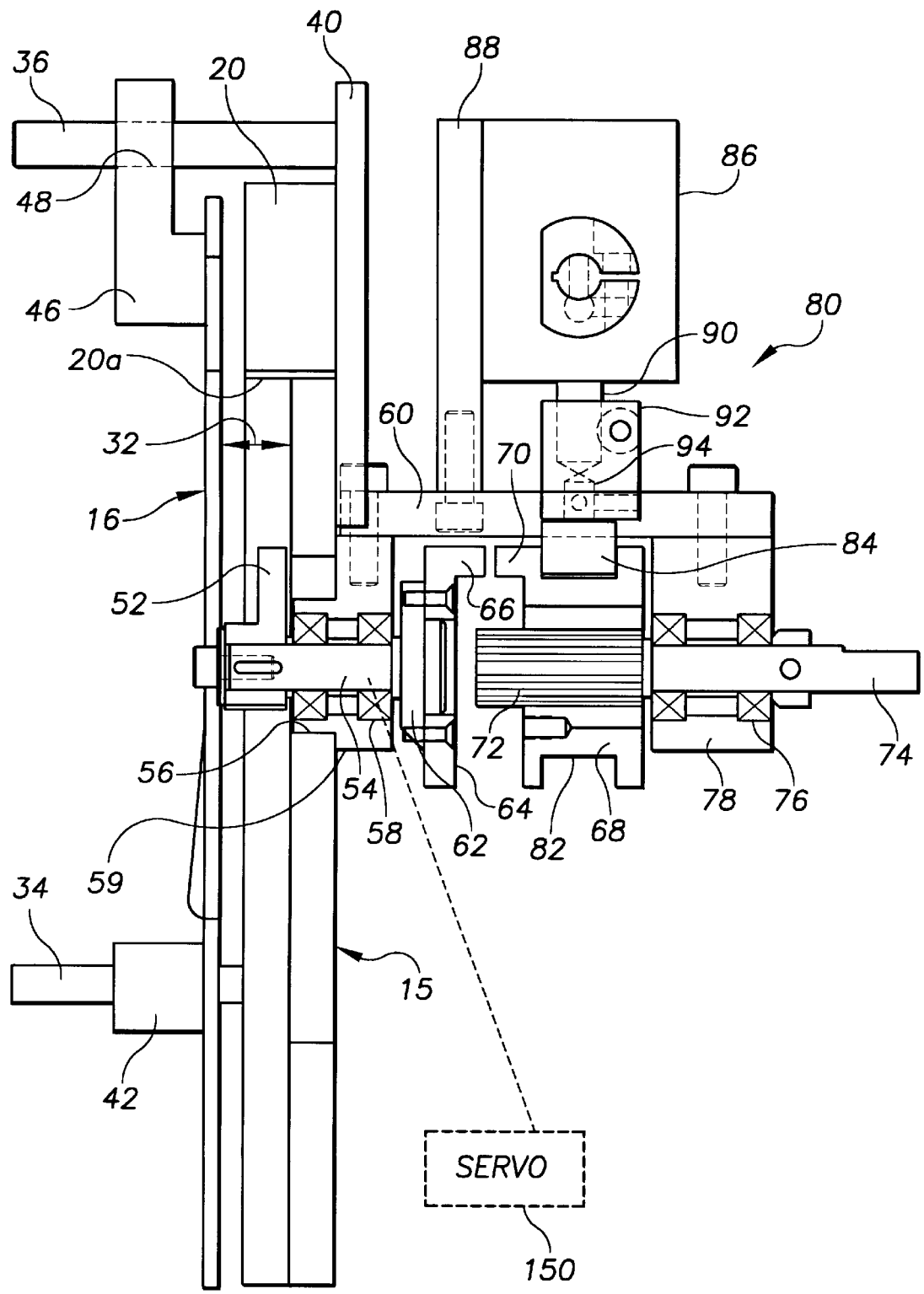
FIG. 3 is a right side elevational view of a portion of the lid infeed system, partially broken away.

As in the prior art, a back plate 15 of a feed plate assembly 9 is provided at the forward end of spinning rods 10 and 12. Further, a front plate 16 of feed plate assembly 9 is provided in parallel, spaced relation in front of back plate 15, and feed plate assembly 9 has an inlet end 18 between back plate 15 and front plate 16, with a width slightly greater than the width of a lid 14 so that a lid 14 can fit therein. Specifically, as best shown in FIG. 3, front plate 16 is positioned in parallel, spaced apart relation in front of back plate 15 so as to define a narrow chamber 32 therebetween through which lids 14 can travel. In order to support plate 16 in such position, a first post 34 extends from a frame member (not shown) adjacent the outlet end 22 of feed plate assembly 9, and a second post 36 extends from a frame member 40 near inlet end 18. A first securing clamp 42 is fixed to the outer surface of front plate 16 and has an opening 44 that receives first post 34, and a second securing clamp 46 is fixed to the outer surface of front plate 16 and has an opening 48 that receives second post 36.

A steel spring 20 is secured by bolts 50 to back plate 15, so that spring 20 overhangs narrow chamber 32. End 20a of spring 20 terminates at a position above and in line with a gap between spinning rods 10 and 12. Accordingly, narrow chamber 32 of feed plate assembly 9 is bounded by front plate 16, back plate 15 and spring 20, such that lids 14 can enter through inlet end 18 and exit through outlet end 22.

Spring 20 applies a slight pressure to lids 14 in order to bias lids 14 into engagement with spinning rod 10 once lid 14 has entered inlet opening 18. Due to the spinning nature of rod 10, lids 14 are caused to move forward and travel through feed plate assembly 9 to outlet end 22.

In order to ensure that the forwardmost lid 14a enters and travels through inlet end 18 of feed plate assembly 9, a finger 52 is rotatably mounted through back plate 15. Finger 52 is shown in different angular orientations in FIGS. 2 and 3.

Specifically, finger 52 has an elongated configuration with a concave, arcuate surface 52a having a radius of curvature similar to the radius of lids 14. Accordingly, as shown in FIG. 2, when finger 52 rotates in the clockwise direction of FIG. 2, arcuate surface 52a engages the outer periphery of the forwardmost lid 14a and pushes this lid 14 through inlet end 18 of feed plate assembly 9, that is, into chamber 32.

As a result, the forwardmost lid 14a which is kicked into inlet opening 18, thereafter travels through feed plate assembly 9 by reason of spinning rod 10, and exits through outlet opening 22 thereof, where the lid 14 is adhered to a vacuum wheel 24 having openings 26 through which a vacuum is applied and to which lid 14 adheres through the vacuum.

Figure 2:
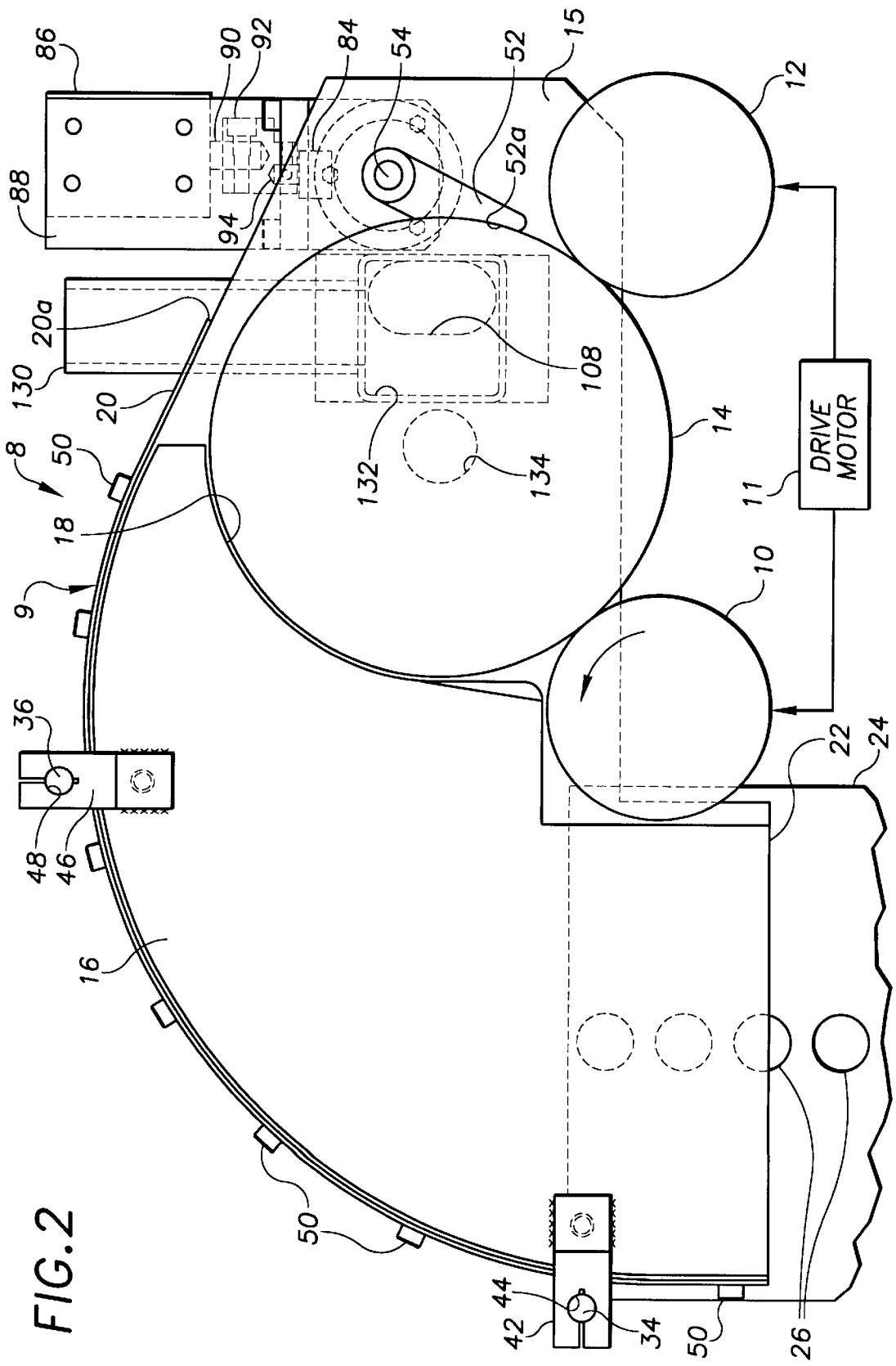
FIG. 2 is a front elevational view of a lid infeed system according to the present invention.

As shown in FIGS. 2 and 3, finger 52 is mounted on a shaft 54 that extends through an opening 56 in back plate 15, and is rotatably supported at its opposite end at the rear of back plate 15 by a bearing assembly 58 mounted in a frame member 59 secured to a frame element 60. Shaft 54 is coupled at its rear end through a coupling element 62 to a circular plate 64 having a rearwardly extending projection 66.

A rotatable element 68 having a forwardly extending projection 70 is positioned rearwardly of circular plate 64 and projection 66. Specifically, rotatable element 68 is slidably and non-rotatably mounted on a spline 72 that is axially connected with a drive shaft 74 that is timed through gearing (not shown) with the main drive shaft of the machine. Drive shaft 74 is rotatably supported by a bearing assembly 76 mounted in a frame member 78 that is fixed to frame element 60.

When rotatable element 68 is moved forward on spline 72, that is, to the left in FIG. 3, projection 70 engages behind projection 66. Thus, during rotation of rotatable element 68 by drive shaft 74, and due to the engaging projections 66 and 70, plate 64, and thereby shaft 54, are caused to rotate therewith. As a result, finger 52, during each rotation, pushes or kicks the forwardmost lid 14a into inlet end 18 of feed plate assembly 9.

Figure 4:
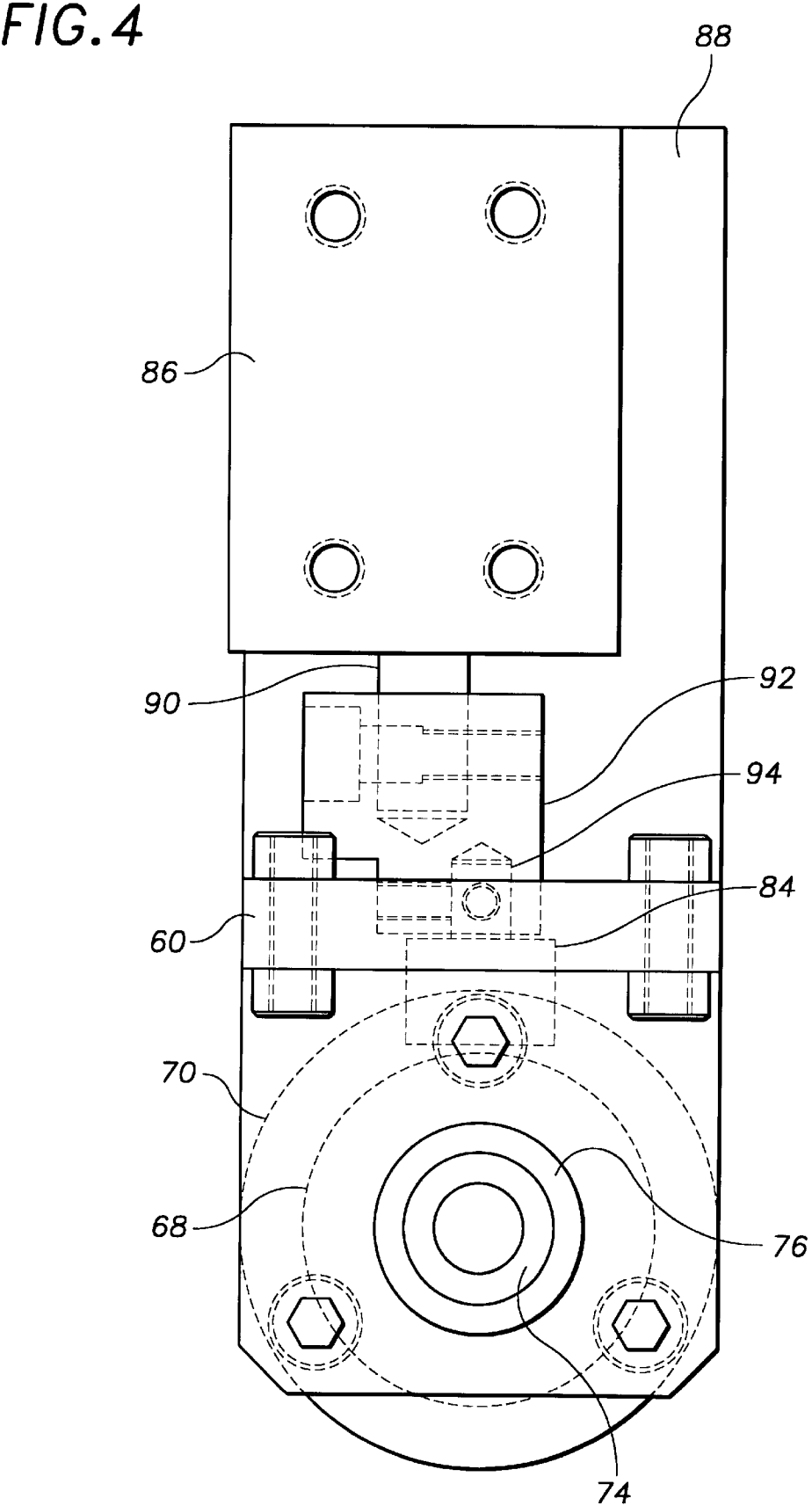
FIG. 4 is a rear elevational view of the drive assembly for the finger.

In order to move rotatable element 68 to the left in FIG. 3, a translation assembly 80 is provided. Specifically, rotatable element 68 includes a center annular recess 82. Translation assembly 80 includes a cam follower 84 positioned in annular recess 82. Cam follower 84 serves to slide rotatable element 68 along spline 72, while permitting rotation of rotatable element 68. Translation assembly 80 further includes pneumatic rotary actuator 86 mounted to a frame element 88 which is also secured to frame element 60. Rotary pneumatic actuator 86 includes a rotatable output shaft 90 that is connected with a lever arrangement 92 with two centers, that is, an off-center or eccentric arrangement. Lever arrangement 92 is connected at its opposite end to cam follower 84. The two centers of lever arrangement 92 are provided by the axial center of output shaft 90 connected with lever arrangement 92 at one position, and the axial center of another vertical shaft 94 of lever arrangement 92, connected to cam follower 84 and offset from the axial center of output shaft 90, as best shown in FIG. 4. As a result of this arrangement, rotation of output shaft 90 causes lever arrangement 92 to move cam follower 84 to the left or right in FIG. 3 which, in turn, forces rotatable element 68 to the left in FIG. 3 for engagement of projections 66 and 70 or to the right in FIG. 3 for disengagement of projections 66 and 70.

Alternatively, a servo arrangement 150 (shown in dashed lines) can be connected with shaft 54 in order to drive the same, with servo arrangement 150 being electronically controlled to be timed with other machine components.

However, even with this arrangement, problems may arise. Specifically, lids 14 generally have lips which nest within each other in the stack. As a result of this nesting arrangement, it is sometimes difficult to disengage the forwardmost lid 14a from the remainder of the stack, which may result in the machine being shut down.

Figure 6:
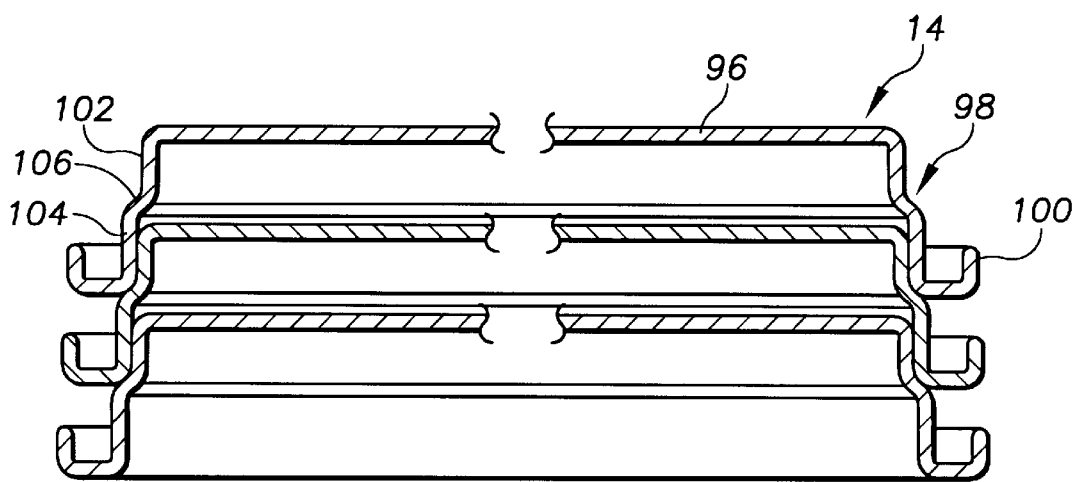
FIG. 6 is a cross-sectional view of three nested lids of the stack.

One example of such lids 14 which nest within each other is shown in FIG. 6, although it will be appreciated that there are any other different configurations of such nesting lids. As shown, each lid 14 includes a top wall 96, an annular side wall 98 have an upper end connected to the periphery of top wall 96 and a lower end connected to an annular lip 100. Although annular lip 100 can take any shape, the annular lip 100 is shown as having a U-shaped cross-sectional configuration. In addition, side wall 98 is comprised of an upper annular side wall portion 102 of a first radius and a lower annular side wall portion 104 of a second larger radius, thereby creating an outer annular shoulder 106. When lids 14 nest within each other, the annular lip 100 of one lid 14 seats on outer annular shoulder 106 and around outer annular side wall portion 102 of an adjacent lid 14.

It will therefore be appreciated that, when finger 52 pushes the forwardmost lid 14a toward inlet end 18 of feed plate assembly 9, it may be difficult to disengage the nesting lids 14, which can result in shutting down of the machine.

Figure 5:
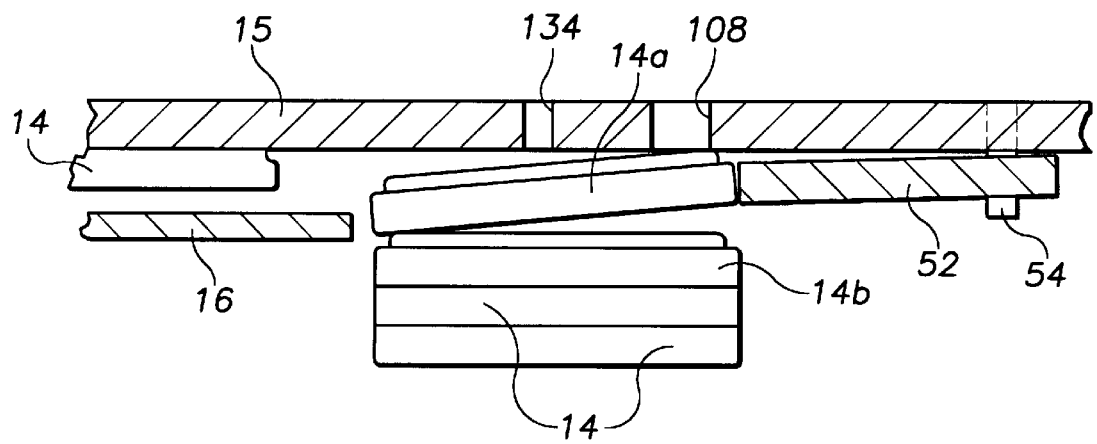
FIG. 5 is a cross-sectional view of a portion of the lid infeed system, showing the operation thereof.

In order to overcome this problem, back plate 15 includes a vertically elongated vacuum opening 108 which corresponds in position with the right side of the forwardmost lid 14a positioned on spinning rods 10 and 12, as viewed in FIG. 2. A vacuum is applied through elongated vacuum opening 108 which pulls the right side of the forwardmost lid 14a away from the stack of lids 14, as shown in FIG. 5. The vacuum is applied from a vacuum source (not shown) and through a vacuum chamber 132 from a conduit 130 behind back plate 15 and which is in fluid communication with elongated vacuum opening 108. The vacuum thereby pulls the right side of the forwardmost lid 14a out of this nesting arrangement, as shown in FIG. 5.

In operation, the right side of forwardmost lid 14a is pulled to vacuum opening 108, as shown in FIG. 5. In this regard, the vacuum is continuously applied to vacuum opening 108. Then, after the right side of forwardmost lid 14a is pulled to back plate 15, finger 52 is rotated in the clockwise direction of FIG. 2, and pushes the forwardmost lid 14a to the left in FIGS. 2 and 5. As the forwardmost lid 14a is moved slightly to the left in FIGS. 2 and 5, the right edge of the leading lid 14a clears the nesting arrangement of the next lid 14b in the stack, thereby overcoming the nesting problem of the prior art. In such position, the forwardmost lid 14a is free to enter inlet end 18 of feed plate assembly 9, without worrying about disengagement of forwardmost lid 14a from the remainder of the stack. Accordingly, even if lids 14 are provided with lips 100, there are no problems with moving the forwardmost lid 14a away from the stack.

Because spring 20 presses the forwardmost lid 14a down onto spinning rod 10, spinning rod 10 continues rotating and forces the forwardmost lid 14a from feed plate assembly 9 onto vacuum wheel 24 at the outlet end 22 of feed plate assembly 9. Vacuum wheel 24 is provided immediately below outlet end 22 and includes vacuum holes 26 around the circumference thereof which are fluidly connected with a vacuum in the interior of vacuum wheel 24, supplied thereto by a vacuum source (not shown).

It is possible that a vacuum can be set up within the center of a lid 14 at back plate 15, that is, in an area bounded by back plate 15 and top wall 96 of a lid 14, even after the forwardmost lid 14a passes elongated vacuum opening 108. In this case, a vacuum release hole 134 which is provided in back plate 15, to the left of vacuum opening 108 in FIG. 2, releases the vacuum to ambient pressure to prevent this occurrence, after the forwardmost lid 14a has started traveling into channel 32 of feed plate assembly 9. Otherwise, the forwardmost lid 14a might vacuum lock to back plate 15 after passing elongated vacuum opening 108.

Thus, with the present invention, the forwardmost lid 14a is transported from the stack to vacuum wheel 24 by using a vacuum that separates the forwardmost lid 14a from the nesting arrangement with the stack.

It will be appreciated that modifications can be made to the present invention within the scope of the claims herein. For example, although finger 52 is shown as being rotatable, finger 52 can instead be translatable from right to left in FIG. 2 to move the forwardmost lid 14a into inlet end 18 of feed plate assembly 9. Further, many different drive assemblies can be used in place of translation assembly 80 and drive shaft 74.

Although the invention has been disclosed with respect to nesting lids, the present invention can just as well function with non-nesting lids.

Having described a specific preferred embodiment of the invention with reference to the accompanying drawings, it will be appreciated that the present invention is not limited to that precise embodiment, and that various changes and modifications can be effected therein by one of ordinary skill in the art without departing from the scope or spirit of the invention as defined by the appended claims.

What is claimed is:

1. A lid infeed system comprising:
   a pair of spinning rods for holding a stack of lids thereon; and
   a feed plate assembly including:
      a back plate at a forward end of said spinning rods against which the lids are moved by said spinning rods, a front plate in front of said back plate, an inlet opening defined by the front plate and the back plate, an outlet opening defined by the front plate and the back plate, a vacuum opening arranged at a position in said back plate for pulling a forwardmost one of said lids against said back plate and away from a next one of said lids of said stack, a finger mounted adjacent said vacuum opening, and a drive for moving said finger to force the forwardmost one of said lids into the inlet opening after the forwardmost one of said lids has been pulled against said back plate and away from the next one of said lids of said stack at said vacuum opening.

2. A lid infeed system according to claim 1, wherein said spinning rods are substantially parallel and adjacent to each other.

3. A lid infeed system according to claim 1, wherein said vacuum opening is arranged at a position offset to one side of a center plane between said spinning rods so as to pull only one side of the forwardmost one of said lids against said back plate and away from a next one of said lids of said stack.

4. A lid infeed system according to claim 3, wherein said vacuum opening has a vertically elongated configuration.

5. A lid infeed system according to claim 1, wherein said finger is rotatably mounted to said back plate adjacent said vacuum opening, and said drive rotatably moves said finger.

6. A lid infeed system according to claim 1, further comprising a vacuum device at a rear side of said back plate and in fluid communication with said vacuum opening for supplying a vacuum to said vacuum opening.

7. A lid infeed system comprising:

a pair of spinning rods for holding a stack of lids thereon; and a feed plate assembly including:

a back plate at a forward end of said spinning rods against which the lids are moved by said spinning rods, a front plate in front of said back plate, an inlet opening defined by the front plate and the back plate, an outlet opening defined by the front plate and the back plate, a vacuum opening arranged at a position in said back plate for pulling a forwardmost one of said lids against said back plate and away from a next one of said lids of said stack, a finger mounted adjacent said vacuum opening, a drive for moving said finger to force the forwardmost one of said lids into the inlet opening after the forwardmost one of said lids has been pulled against said back plate and away from the next one of said lids of said stack at said vacuum opening, and a vacuum release opening in said back plate between said vacuum opening and said inlet opening for releasing any vacuum trapped between the forwardmost one of said lids and said back plate.

8. A lid infeed system according to claim 7, wherein said finger is rotatably mounted to said back plate adjacent said vacuum opening, and said drive rotatably moves said finger.

9. A lid infeed system according to claim 7, wherein said spinning rods are substantially parallel and adjacent to each other.

10. A lid infeed system according to claim 7, wherein said vacuum opening is arranged at a position offset to one side of a center plane between said spinning rods so as to pull only one side of the forwardmost one of said lids against said back plate and away from a next one of said lids of said stack.

11. A lid infeed system according to claim 10, wherein said vacuum opening has a vertically elongated configuration.

12. A lid infeed system according to claim 7, further comprising a vacuum chamber at a rear side of said back plate and in fluid communication with said vacuum opening for supplying a vacuum to said vacuum opening.

* * * * *